(12) United States Patent
Kreutzkämper et al.

(10) Patent No.: US 8,701,838 B2
(45) Date of Patent: Apr. 22, 2014

(54) LUBRICANT SUPPLY DEVICE AND METHOD FOR OPERATING A LUBRICANT SUPPLY DEVICE

(75) Inventors: Jürgen Kreutzkämper, Berlin (DE); Paul Sattelberger, Reilingen (DE)

(73) Assignee: Aktiebolaget SKF, Gothenburg (SE)

( * ) Notice: Subject to any disclaimer, the term of this patent is extended or adjusted under 35 U.S.C. 154(b) by 321 days.

(21) Appl. No.: 13/006,585

(22) Filed: Jan. 14, 2011

(65) Prior Publication Data
US 2011/0174577 A1 Jul. 21, 2011

(30) Foreign Application Priority Data
Jan. 15, 2010 (DE) .......................... 10 2010 004 839

(51) Int. Cl.
*F01M 1/00* (2006.01)
*F16N 7/14* (2006.01)
*F16N 21/00* (2006.01)

(52) U.S. Cl.
USPC ...................... 184/26; 184/39.1; 184/105.1

(58) Field of Classification Search
USPC .......... 184/14, 26, 27.1, 39.1, 41, 45.1, 105.1
See application file for complete search history.

(56) References Cited

U.S. PATENT DOCUMENTS

| 526,838 | A | * | 10/1894 | Hunter | 184/45.1 |
| 542,957 | A | * | 7/1895 | Furguson | 184/45.1 |
| 1,589,147 | A | * | 6/1926 | Groeneveld | 184/45.1 |
| 1,737,838 | A | * | 12/1929 | Fuller | 184/45.1 |
| 1,901,148 | A | * | 3/1933 | Creveling | 417/388 |
| 3,326,323 | A | * | 6/1967 | Delker | 184/6 |
| 3,955,852 | A | * | 5/1976 | De Puydt et al. | 301/108.1 |
| 4,058,185 | A | * | 11/1977 | Ploeger | 184/5.1 |
| 4,113,059 | A | * | 9/1978 | Markovski | 184/5.1 |
| 4,113,061 | A | * | 9/1978 | Peaster | 184/41 |
| RE34,391 | E | * | 9/1993 | Blake | 184/5.1 |
| 6,244,387 | B1 | * | 6/2001 | Paluncic et al. | 184/37 |
| 2004/0129499 | A1 | * | 7/2004 | Okpokowuruk | 184/26 |
| 2004/0155068 | A1 | | 8/2004 | Weigand et al. | |
| 2009/0078507 | A1 | | 3/2009 | Gaugush et al. | |

FOREIGN PATENT DOCUMENTS

| DE | 19955865 A1 | 11/2000 |
| EP | 1213529 A1 | 6/2002 |
| JP | 2006029352 A | 2/2006 |

* cited by examiner

*Primary Examiner* — William A Rivera
*Assistant Examiner* — Minh Truong
(74) *Attorney, Agent, or Firm* — Bryan Peckjian; SKF USA Inc. Patent Department

(57) ABSTRACT

A lubricant supply device comprises a tank configured to hold a lubricant. At least one movable piston unit is disposed in the holding tank and at least partially defines a lubricant chamber. The lubricant chamber has at least two openings, of which one is a lubricant inlet and the other is a lubricant outlet. A first one of the openings is disposed in the movable piston unit.

16 Claims, 2 Drawing Sheets

LUBRICANT SUPPLY DEVICE AND METHOD FOR OPERATING A LUBRICANT SUPPLY DEVICE

CROSS-REFERENCE

This application claims priority to German patent application no. 10 2010 004 839.9 filed on Jan. 15, 2010, the contents of which are incorporated fully herein by reference.

TECHNICAL FIELD

The present invention generally relates to a lubricant supply device and to a method for operating a lubricant supply device.

RELATED ART

Known lubricant supply devices include a pump attached to a holding tank that pumps the lubricant located in the holding tank from the holding tank to a lubricant outlet. Thus, a device connected with the lubricant outlet can be supplied with lubricant.

For proper operation of the lubricant supply device and the to-be-lubricated device, it is necessary that no air is present in the lubricant and/or is introduced into the lubricant. However, the volume occupied by the lubricant stored in the holding tank decreases as the lubricant is drained. Thus, in order to seal such a variable volume and prevent the ingress of air into the lubricant chamber and/or into the lubricant, a movable piston is provided in the holding tank and partially defines the lubricant chamber. The piston seals that lubricant chamber relative to the rest of the volume of the holding tank so that no air from the holding tank can permeate into the lubricant chamber and thus into the lubricant. As a result, when the lubricant is drained from the lubricant chamber by the pump, the movable piston follows the decreasing volume. Furthermore, the increasing remaining volume of the holding tank is simultaneously filled with air via an air inlet valve or an opening. In this known embodiment, the piston is a purely passive component that simply follows the varying volume of the lubricant contained in the lubricant chamber.

As soon as the lubricant located in the lubricant chamber is reduced to a predetermined amount or level, new lubricant must be re-filled into the lubricant chamber. For this purpose, the pump is connected with a lubricant reservoir and, by appropriate operation thereof, it conveys or imports new lubricant into the lubricant chamber. As a result, the piston is moved in the opposite direction by the new lubricant so that the volume of the lubricant chamber continuously increases.

In the alternative, the lubricant can be conveyed to the lubricant outlet by actively or positively moving the piston. In this case, by moving the piston in the direction of the lubricant outlet, the lubricant is pressed out of the lubricant chamber due to the decreasing volume and the lubricant is thus furnished to the lubricant outlet.

The above-described known lubricant supply devices usually are not completely emptied during normal operation. Consequently, a small amount of lubricant always remains in the lubricant chamber. The piston is moved in the opposite direction to fill the lubricant chamber with lubricant again, wherein lubricant is simultaneously guided into the lubricant chamber via a lubricant inlet and/or lubricant is pumped into the lubricant chamber. The volume of the lubricant chamber is thus enlarged in each case.

SUMMARY

In one aspect of the present teachings, an improved lubricant supply device and an improved method for operating a lubricant supply device are disclosed.

In another aspect of the present teachings, a lubricant supply device is provided with a holding tank for a lubricant. At least one movable piston unit is provided in the holding tank for at least partially defining a lubricant chamber that includes at least two openings, i.e. a lubricant inlet and a lubricant outlet. One of the openings is disposed in the piston unit. The other opening is preferably disposed in the lubricant chamber such that it is substantially opposite of the opening disposed in the piston unit. Thus, for every possible position or state of the movable piston unit in the holding tank, the two openings are spaced by the maximum possible distance relative to the dimensions of the lubricant chamber.

In the following description, the invention will be described with the assistance of an example, wherein the lubricant opening disposed in the piston unit is an inlet. As a consequence thereof, the other opening is embodied as a lubricant outlet. In the alternative, it is also possible, however, to dispose the lubricant outlet in the piston unit and, in a corresponding manner, to dispose the lubricant inlet on the opposite side of the lubricant chamber. This is applicable to all the following embodiments of the invention.

Similar to the known embodiment described above in the Related Art section, the piston unit of the present teachings may comprise a passive piston or an active piston that at least partially defines the lubricant chamber. If a passive piston is utilized, the lubricant supply device preferably includes a pump that, by appropriate operation thereof, pumps lubricant from the lubricant chamber to the lubricant outlet, whereby the volume of the lubricant chamber decreases. The piston passively follows the reduction of the volume by moving in a corresponding manner in the holding tank.

If an active piston is utilized, the piston is moved, e.g., by application of pressure or other mechanical force, whereby lubricant is transported to the lubricant outlet.

In known lubricant supply devices, the lubricant inlet is disposed on the same side of the lubricant chamber as the lubricant outlet. Consequently, the lubricant chamber is filled with fresh lubricant such that unused lubricant remains in the lubricant chamber between the new lubricant and the piston. However, this unused lubricant will always remain in the lubricant chamber and thus will age when the lubricant supply device is used over a long period of time, and/or due to the temperature fluctuations or other similar influences. In particular when lubricating greases are used, the proportion of oil in the lubricating grease decreases with increasing duration of use. The lubricating grease thus becomes harder, which can impair the operation of the lubricant supply device. In one aspect of the present teachings, this problem of known lubricant supply devices can be avoided.

For example, in one aspect of the present teachings, the lubricant inlet is disposed or defined in the piston unit, which ensures that the new lubricant is imported or conveyed into the lubricant chamber directly underneath the piston unit during the re-filling of the lubricant chamber. After the re-filling, the old lubricant, which is still located in the lubricant chamber due to the incomplete emptying thereof, is now located between the new lubricant and the lubricant outlet. Therefore, it is ensured in a relatively simple manner that, during the next lubricant supply cycle, the old lubricant of the last cycle is first furnished to the lubricant outlet and then the newly-filled lubricant is subsequently furnished. Consequently, a complete replacement or turnover of the lubricant in the lubricant chamber is ensured in each cycle.

The same advantages result in an analogous manner when the lubricant outlet is disposed or defined in the piston and the lubricant inlet is defined so as to be opposite of the lubricant outlet in a corresponding manner. In this case, the new lubricant is imported opposite of the piston during the re-filling of the lubricant chamber. In this embodiment as well, the old lubricant is located between the new lubricant and the lubricant outlet. Thus, by arranging the openings in this manner, a complete replacement of the lubricant is also ensured in each operation cycle.

In a preferred embodiment of the present teachings, the piston is disposed such that, during the movement in one direction, a reduction of the volume of the lubricant chamber is effected, wherein lubricant is provided to the lubricant outlet and, during the movement in the other direction, an enlargement of the volume of the lubricant chamber is effected, wherein lubricant is fed from the lubricant inlet into the lubricant chamber.

In an alternative embodiment of the present teachings, the lubricant supply device includes a pump. The lubricant in the lubricant chamber can be provided to the lubricant outlet by the pump. In this case, the piston unit is preferably movable only in a passive manner.

In another preferred embodiment of the present teachings, the lubricant inlet is embodied or defined as a duct in the piston that is connected with a filling device via a conduit. With this arrangement, lubricant can be furnished through the conduit to the lubricant inlet in a simple manner during the refilling of the lubricant chamber. The filling device can be embodied, e.g., as a pump disposed outside on the holding tank. In this case, the pump pumps lubricant located in a reservoir through the conduit to the lubricant inlet in accordance with the movement of the piston. As soon as the pump furnishes lubricant to the lubricant inlet, the lubricant chamber is newly filled. The piston of the piston unit thus moves in a corresponding manner. It is preferred that the steps for operating the lubricant supply device are coordinated such that no air is introduced into the lubricant chamber. Only in this way is a continuous furnishing of lubricant to the lubricant outlet to be ensured. Accordingly, the control of the pump must be coordinated.

In another preferred embodiment of the present teachings, the conduit is embodied as a spiral-shaped hose. A hose formed in this manner can follow the movements of the piston in an optimal manner and can thus follow a reduction of the available volume without the occurrence of kinks or excessive loads.

In another preferred embodiment of the present teachings, the piston preferably has at least one groove defined on the side that faces the lubricant chamber (i.e. towards the lubricant in the lubricant chamber). The groove is connected or is in fluid communication with the first opening. The lubricant flowing out of the first opening is optimally distributed within the lubricant chamber by the groove during the filling of the lubricant chamber. This is advantageous, in particular, when using viscous lubricants, such as, e.g., greases.

In another aspect of the present teachings, a method is disclosed for operating a lubricant supply device that may preferably include the following method steps:

importing or conveying lubricant into the lubricant chamber via the lubricant inlet, simultaneously moving the piston such that the volume of the lubricant chamber is enlarged, furnishing lubricant to the lubricant inlet, and moving the piston such that the volume of the lubricant chamber is reduced.

According to this method, it is ensured that a complete replacement of the lubricant takes place in each operation (lubricant supply) cycle. Consequently, no lubricant remains in the lubricant chamber for a long time, which leads to an increase of the service life of the lubricant supply device. Preferably, these method steps are repeated in a cyclical manner.

In a preferred embodiment of the present teachings, the following method steps are performed prior to the first enlargement of the volume:

filling the connection between the lubricant inlet and the lubricant chamber with lubricant, filling the lubricant chamber with lubricant, simultaneously exhausting air from the lubricant chamber, and inserting the piston unit such that no gas is introduced into the lubricant chamber.

Further advantages and embodiments of the invention are derivable from the exemplary embodiments described in the following with the assistance of the appended drawings.

DETAILED DESCRIPTION OF THE INVENTION

The embodiments of the prior art and the invention described in the following each relate to the embodiment having a passive piston unit as described in the Related Art section. However, in the alternative, the use of an active piston is also possible in an analogous manner in all the below-described exemplary embodiments.

Figure 1:
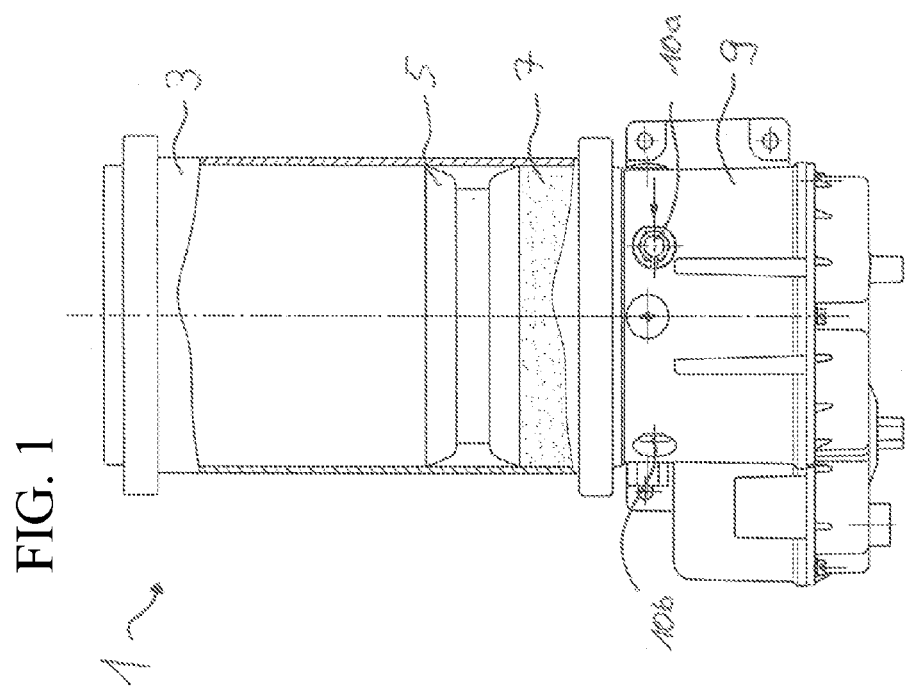
FIG. 1 shows a known lubricant supply device.

A lubricant supply device 1 known from the prior art is illustrated in FIG. 1. It comprises a holding tank 3, which is comprised, e.g., of metal, glass or plastic. The holding tank 3 is illustrated in FIG. 1 in a partially-opened manner, in order to make visible components located in the interior. A movable piston 5 is disposed in the holding tank 3. The piston 5 is movable up and down in the holding tank 3. A lubricant chamber 7 is defined by the movable piston 5 and the boundaries of the holding tank 3. A lubricant, e.g., a lubricating grease, is disposed in the holding tank 3. A conveying device 9 is located on the side of the holding tank 3 that is opposite of the piston 5 relative to the lubricant chamber 7. The conveying device 9 has a lubricant outlet 10a that is connected with the lubricant chamber 7. The conveying device 9 includes a not-illustrated pump for draining the lubricant. That is, the lubricant can be pumped from the lubricant chamber 7 to the lubricant outlet 10a by the pump. The piston 5 is not actively movable in the illustrated exemplary embodiment. Instead, it passively follows changes of the volume of the lubricant chamber 7 (i.e. changes in the lubricant volume) caused by the pump. A not-illustrated conduit is connected, for example, to the lubricant outlet 10a and conveys the lubricant to a to-be-lubricated device in an appropriate manner.

As soon as the piston 5 has reached a position near to the conveying device 9, the compression direction of the pump is reversed so that new lubricant is imported into the lubricant chamber 7. The conveying device 9 has a lubricant inlet 10b for receiving new lubricant. The lubricant inlet 10b is connected, for example, with a lubricant reservoir via a not-illustrated conduit. In the alternative, the conveying device 9 may include a second pump, through which the lubricant is pumped into the lubricant chamber 7. The second pump can also be disposed outside of the lubricant supply device 1.

The lowermost end position of the piston 5 is selected such that the lubricant chamber 7 is never completely emptied. If, on the other hand, the lubricant chamber 7 were to be completely emptied, it could result in a malfunction of the pump of the conveying device 9. Consequently, when new lubricant is refilled, a small amount of lubricant remains in the lubricant chamber 7 between the piston 5 and the lubricant inlet 10b. As a result, the lubricant newly imported into the lubricant chamber 7 is disposed underneath the old lubricant as shown in FIG. 1. Therefore, it is disposed between the old lubricant and the lubricant outlet 10a, so that the new lubricant is first provided at the lubricant outlet 10a when the lubricant is drained again and all or substantially all of the old lubricant remains in the lubricant chamber 7 in the next lubricant supply cycle as well. Over longer usage times of the lubricant supply device 1, the old lubricant undergoes aging phenomena that can negatively influence the operation of the lubricant supply device 1. In particular when lubricating grease is used, it can lead to hardening caused by separation or bleeding of oil that, among other things, impairs the movement of the piston 5. Diminished lubricating properties of the aged lubricant also result in a disadvantageous manner.

Figure 3:
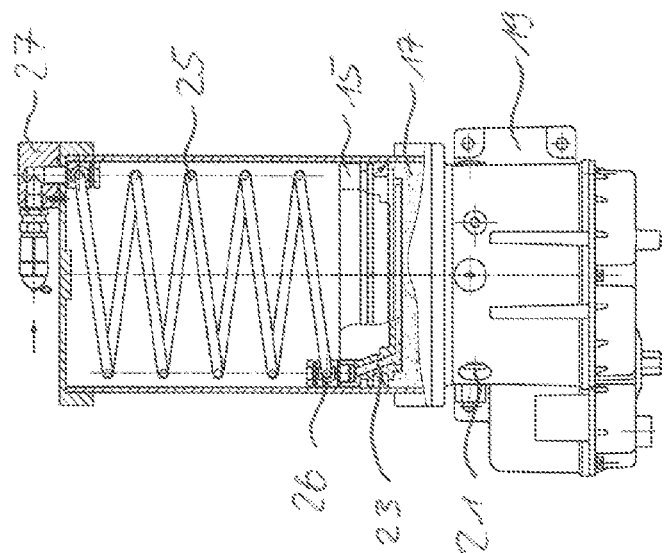
FIG. 3 shows the lubricant supply device of FIG. 2 in a different operational state.
Figure 2:
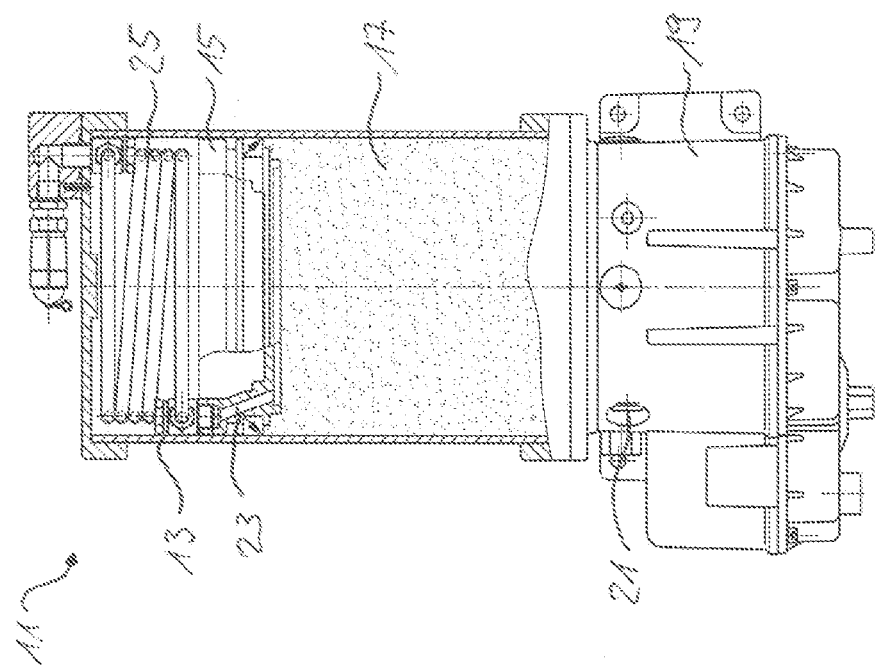
FIG. 2 shows a lubricant supply device according to an embodiment of the invention.

A presently preferred exemplary embodiment of the invention is illustrated in FIGS. 2 and 3 and is shown in two different states of the cycle. FIG. 2 shows a lubricant supply device 11 that includes a holding tank 13. A movable piston 15 is disposed in the holding tank 13 and partially defines a lubricant chamber 17 in a manner analogous to the known embodiment of FIG. 1. The piston 15 is movable up and down so that it can passively follow changes in the volume of the lubricant chamber 17 (i.e. changes in the lubricant volume). A conveyer device 19 is disposed on the lower end of the holding tank 13 and includes a lubricant outlet 21 connected with the lubricant chamber 17. Analogous to the known exemplary embodiment of FIG. 1, the conveyer device 19 includes a pump for removing lubricant from the lubricant chamber 17. The lubricant outlet 21 can be connected with a to-be-lubricated device via a not-illustrated conduit.

In the illustration of FIG. 2, the piston 15 is located at its maximal spacing from the conveyer device 19 so that the volume of the lubricant chamber 17 is maximal. In the illustration of FIG. 3, the piston 15 is located at its minimal spacing relative to the conveyer device 19 so that the volume of the lubricant chamber 17 is minimal. FIG. 3 represents the state, in which the lubricant supplying device 1 should be refilled with new lubricant.

The piston 15 includes a duct 23 that serves as a lubricant inlet and the lubricant can be supplied into the lubricant chamber 17 via the duct 23. The duct 23 is connected with a spiral-shaped hose 25 that is disposed within the (upper) portion of the inner volume of the holding tank 13 that does not belong to the lubricant chamber 17. The hose 25 can be connected with the duct 23, e.g., via a known hose coupling 26.

The hose 25 is pressed together and pulled apart, respectively, in accordance with the movement of the piston 15. The other end of the hose 25 is connected with a filling device 27, via which new lubricant can be supplied. The filling device 27 comprises a pump that pumps lubricant from a not-illustrated reservoir into the lubricant chamber 17 via the hose 25, which results in an upward movement of the piston 15. In the alternative, the pump can also be associated with the reservoir. In this case, the filling device 27 only includes a hose coupling for connecting a connection pipe to the pump.

Due to the opposite arrangement of the duct 23 and the lubricant outlet 21, when the lubricant chamber 17 is refilled with new lubricant, the lubricant remaining in the lubricant chamber 17 after the last lubricant supply cycle is located between the new lubricant and the lubricant outlet 21. Consequently, during the subsequent lubricant supply cycle, the old lubricant is first furnished to the lubricant outlet 21 and the refilled (new) lubricant is then furnished to the lubricant outlet 21 only after the old lubricant has been completely drained. Consequently, a compete replacement or turnover of the lubricant results in every cycle, thereby avoiding the disadvantageous effects on the lubricant supply device 11 in the known embodiment, which result due to the aging of the lubricant that always remains in the lubricant chamber 17.

Figure 4:
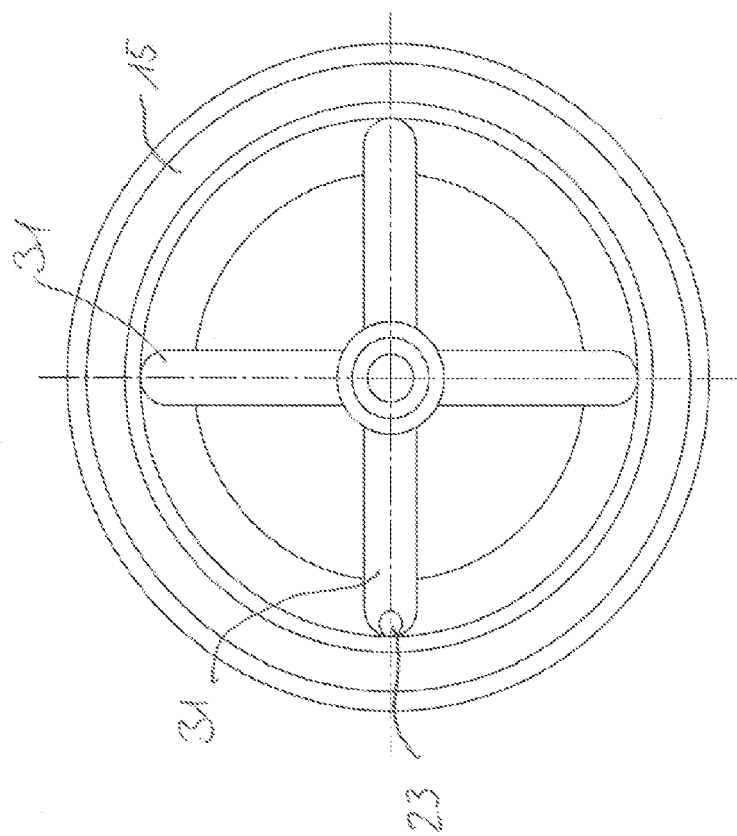
FIG. 4 depicts the bottom side of a preferred piston.

A plan view of the (bottom) side of the piston 15 that faces the lubricant chamber 17 is shown in FIG. 4. A plurality of grooves 31 are defined in the bottom side of the piston 15 and connect to or are in fluid communication with the duct 23. When lubricant is supplied through the hose 25 into the duct 23, the lubricant is optimally distributed along the bottom surface of the piston 15 via the grooves 31, so that the lubricant chamber 17 can be uniformly filled with lubricant.

In preferred applications of the present teachings, no air is introduced into the lubricant during the manufacture of the lubricant supply device. In this case, all of the conduits, pumps and the lubricant chamber are preferably filled in advance with lubricant without trapping air in the lubricant. For example, when grease is used, this can achieved by initially filling the individual components with lubricant and then assembling the components while they are in the filled state. In particular, the hose 25 is preferably filled in advance, so that no air is introduced into the lubricant chamber 17 during the initial supply of lubricant through the hose 25.

The lubricant supply device is preferably operated in a cyclical manner such that lubricant is initially removed from the lubricant chamber 17 by the pump of the conveyer device 19. The lubricant is furnished to the lubricant outlet 21 and is then conveyed to a to-be-lubricated device. Thus, the volume of the lubricant chamber 17 continuously decreases and the piston 15 passively moves toward the lubricant outlet 21. As soon as the piston 15 arrives at a predefined minimal position, new lubricant is imported (filled) into the lubricant chamber 17 via the hose 25 and the duct 23 by another pump of the conveying device 19 or by an external pump. As soon as the lubricant chamber 17 has reached its maximum-possible volume and is filled with lubricant, lubricant is again furnished to the lubricant outlet 21 via the pump of the conveying device 19.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved lubricant supply devices and methods for manufacturing and operating the same.

Moreover, combinations of features and steps disclosed in the above detail description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1. Lubricant supply device
3 Holding tank
5 Piston
7 Lubricant chamber
9 Conveyer device
10a Lubricant inlet
10b Lubricant outlet
11 Lubricant supply device
13 Holding tank
15 Piston
17 Lubricant chamber
19 Conveyer device
21 Lubricant outlet
23 Duct
25 Hose
27 Filling device
31 Groove

The invention claimed is:

1. A lubricant supply device comprising:
a holding tank configured to hold a lubricant, and
at least one movable piston unit disposed in the holding tank and at least partially defining a lubricant chamber, wherein the lubricant chamber has at least two openings, of which one is a lubricant inlet and the other is a lubricant outlet, the lubricant outlet being adapted to be connected to a lubricated device, and a first one of the openings is formed by a duct in the movable piston unit, the duct being in fluid communication with a lubricant conduit formed by a flexible hose disposed within the holding tank.

2. A lubricant supply device according to claim 1, wherein the first opening is defined as a duct in the piston unit and the duct is connectable with a filling device via a conduit.

3. A lubricant supply device according to claim 2, wherein the filling device is disposed on a side of the holding tank, the side being located opposite of the lubricant chamber with reference to the piston unit.

4. A lubricant supply device according to claim 3, wherein the conduit comprises a spiral-shaped hose.

5. A lubricant supply device according to claim 4, wherein at least one groove is defined on a side of the piston unit that faces the lubricant chamber, the at least one groove being in fluid communication with the lubricant inlet.

6. A lubricant supply device according to claim 5, wherein the groove is one of straight, circular and spiral-shaped.

7. A lubricant supply device according to claim 1, wherein the first opening is defined as a duct in the piston unit and the duct is connected with a filling device via a conduit.

8. A lubricant supply device according to claim 1, wherein at least one groove is defined on a side of the piston unit that faces the lubricant chamber, the at least one groove being in fluid communication with the lubricant inlet.

9. A method for providing lubrication, comprising:
providing a lubricant supply device which comprises:
a holding tank configured to hold a lubricant, and
at least one movable piston unit disposed in the holding tank and at least partially defining a lubricant chamber, wherein the lubricant chamber has at least two openings, of which one is a lubricant inlet and the other is a lubricant outlet, the lubricant outlet being adapted to be connected to a lubricated device, and a first one of the openings is defined formed by a duct in the movable piston unit the duct being in fluid communication with a lubricant conduit formed by a flexible hose disposed within the holding tank;
importing lubricant into the lubricant chamber via the lubricant inlet while simultaneously moving the at least one movable piston unit such that the volume of the lubricant chamber increases, and
furnishing lubricant to the lubricant outlet while simultaneously moving the at least one movable piston unit such that the volume of the lubricant chamber is reduced.

10. A method according to claim 9, wherein the method steps are repeated in a cyclical manner.

11. A method according to claim 10, further comprising performing the following method steps prior to a first enlargement of the volume of the lubricant chamber:
filling a connection between the lubricant inlet and the lubricant chamber with lubricant,
filling the lubricant chamber with lubricant while simultaneously exhausting air from the lubricant chamber, and
inserting the piston unit such that no gas is introduced into the lubricant chamber.

12. A lubricant supply device comprising:
a tank configured to hold a lubricant, and
at least one piston movably disposed in the holding tank and at least partially defining a variable lubricant chamber in the holding tank,
wherein a first opening is defined in one of the piston and the tank and a second opening is defined in the other of the piston and the tank, the first and second openings defining a lubricant inlet and a lubricant outlet, respectively, and
the first and second openings are configured such that new lubricant supplied into the lubricant chamber via the lubricant inlet will be disposed between old lubricant remaining in the lubricant chamber and the piston such that, in a subsequently lubricant supply operation, the old lubricant will be furnished to the lubricant outlet prior to the new lubricant being supplied to the lubricant outlet,
wherein the first opening is defined as a duct in the piston and the duct is in fluid communication with a lubricant conduit, and
wherein the lubricant conduit comprises a flexible hose that is spiral shaped.

13. A lubricant supply device according to claim 12, wherein the first opening is defined in the piston and the second opening is defined in a surface of the tank that is opposite of the piston.

14. A lubricant supply device according to claim 12, wherein at least one groove is defined on a side of the piston that faces the lubricant chamber, the at least one groove being in fluid communication with the duct.

15. A lubricant supply device according to claim 14, wherein the groove is one of straight, crossed, circular and spiral-shaped.

16. A lubricant supply device according to claim 15, wherein the piston is maximally spaced from the surface of the tank containing the second opening when the variable lubricant chamber is maximally filled with lubricant.

* * * * *